United States Patent
Funk et al.

(10) Patent No.: US 12,112,331 B2
(45) Date of Patent: Oct. 8, 2024

(54) RULE BASED MACHINE LEARNING FOR PRECISE FRAUD DETECTION

(71) Applicant: MASTERCARD TECHNOLOGIES CANADA ULC, Vancouver (CA)

(72) Inventors: Thomas Funk, Vancouver (CA); Nicholas Desmond, Port Moody (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 85 days.

(21) Appl. No.: 17/463,652

(22) Filed: Sep. 1, 2021

(65) Prior Publication Data

US 2023/0061914 A1   Mar. 2, 2023

(51) Int. Cl.
*G06Q 40/00*    (2023.01)
*G06N 5/01*    (2023.01)
(Continued)

(52) U.S. Cl.
CPC ........... *G06Q 20/4016* (2013.01); *G06N 5/01* (2023.01); *G06N 5/046* (2013.01); *G06N 20/00* (2019.01)

(58) Field of Classification Search
CPC ...... G06Q 20/4016; G06N 20/00; G06N 5/01; G06N 5/046
See application file for complete search history.

(56) References Cited

U.S. PATENT DOCUMENTS 11,416,748 B2 * 8/2022 Patil ..................... G06N 20/20
11,675,817 B1 * 6/2023 Pratik ................... G06N 5/046
                                                             707/740

(Continued)

FOREIGN PATENT DOCUMENTS

WO   WO-2020188425 A1 *  9/2020
WO   WO-2022082010 A1 *  4/2022  ............ G01M 13/00
(Continued)

OTHER PUBLICATIONS

Dubey et al., "Analysis of Sampling Techniques for Imbalanced Data: An N=648 ADNI Study," NIH Public Acccess, Neuroimage, Feb. 15, 2014 (Year: 2014).*

(Continued)

*Primary Examiner* — Abhishek Vyas
*Assistant Examiner* — William B. Bunker
(74) *Attorney, Agent, or Firm* — Michael Best & Friedrich LLP (57) ABSTRACT

Methods and systems for rule-based machine learning for precise fraud detection. One system includes an electronic processor configured to determine, via a decision tree, a first subset of datasets of an aggregate dataset collection generated using a rule-based model. The electronic processor is also configured to select a third collection of datasets, each dataset included in the third collection of datasets associated with a user characteristic associated with fraud. The electronic processor is also configured to determine, via the decision tree, a second subset of datasets of the third collection of datasets, each dataset included in the second subset of datasets associated with a second set of user characteristics associated with fraud. The electronic processor is also configured to, in response to determining that an accuracy score associated with the second set of user characteristics satisfies a threshold, generate and transmit a report for display.

17 Claims, 4 Drawing Sheets

(51) Int. Cl.
*G06N 5/046* (2023.01)
*G06N 20/00* (2019.01)
*G06Q 20/40* (2012.01)

(56) References Cited

U.S. PATENT DOCUMENTS

| | | | |
|---|---|---|---|
| 2003/0220860 | A1 | 11/2003 | Heytens et al. |
| 2016/0132886 | A1 | 5/2016 | Burke et al. |
| 2017/0270429 | A1* | 9/2017 | Bhattacharya ......... G06N 20/10 |
| 2020/0372383 | A1* | 11/2020 | Cao ........................ G06N 20/00 |
| 2021/0117718 | A1* | 4/2021 | Badjatiya .............. G06F 18/214 |
| 2021/0233082 | A1* | 7/2021 | Gagpalliwar .......... G06N 20/20 |
| 2021/0264318 | A1* | 8/2021 | Butvinik ................ G06F 18/214 |
| 2022/0083571 | A1* | 3/2022 | Schmidt ................ G06F 16/285 |
| 2022/0222931 | A1* | 7/2022 | Goyal ................. G06V 10/7747 |
| 2022/0374410 | A1* | 11/2022 | Tepper ................ G06F 16/2365 |
| 2023/0128462 | A1* | 4/2023 | Hassan ...................... G06N 5/01 726/23 |

FOREIGN PATENT DOCUMENTS

| | | | | |
|---|---|---|---|---|
| WO | WO-2022084261 | A1 * | 4/2022 | ............. G06N 20/00 |
| WO | WO-2022240860 | A1 * | 11/2022 | |

OTHER PUBLICATIONS

Kumari et al., "Impact of the composition of feature extraction and class sampling in medicare fraud detection," arXiv:2206.01413v2 2022 (Year: 2022).*

Ahmed et al., "A Comparative Study of Credit Card Fraud Detection Using the Combination of Machine Learning Techniques with Data Imbalance Solution," 2nd International Conference on Computing and Data Science, 2022 (Year: 2022).*

Manjeri et al., "A Machine Learning Approach for Detecting Malicious Websites using URL Features," Proceedings on the Third International Conference on Electronics Communication and Aerospace Technology, 2019 (Year: 2019).*

Zahra et al., "Feature Extraction for Class Imbalance Using a Convolutional Autoencoder and Data Sampling," IEEE 33rd International Conference on Tools with Artificial Intelligence, 2021 (Year: 2021).*

International Search Report and Written Opinion for Application No. PCT/CA2022/051302, dated Dec. 2, 2022 (11 pages).

* cited by examiner

RULE BASED MACHINE LEARNING FOR PRECISE FRAUD DETECTION

FIELD

Embodiments described herein relate to rule-based machine learning for precise fraud detection.

BACKGROUND

Applications exist that require high-precision fraud detection, such as for e-transfer applications. However, many service providers are unable to provide such necessary high-precision fraud detection. Accordingly, there is a need to improve the precision of fraud detection with respect to various applications, included, for example, e-transfer applications. In particular, there is a need for detecting heavily imbalanced fraud (for example, less than 1% of all traffic).

SUMMARY

Accordingly, the embodiments described herein provide methods and systems for rule-based machine learning for precise fraud detection (such that heavily imbalanced fraud may be detected). The embodiments described herein begin by taking a sampling of user data generated during a session. The sampling of user data may include, for example, one or more transfer characteristics, device characteristics, input characteristics, geo-location characteristics, or the like. The embodiments combine the sampling of user data with confirmed fraudulent data (for example, a binary target linked to one or more user characteristics or unique identifiers associated with fraud). In some embodiments, the confirmed fraudulent data may be supplied by a client or other third-party user. The embodiments run this combined dataset through a rule-based model to transform the characteristics into a numerical aggregate (rule-based data points) from the session.

In some embodiments, the dataset is further run through a feature engineering model that duplicates each rule-based data point and then divides the dataset (for example, each unique user characteristic in the dataset) against the whole (effectively turning the dataset into a percent of the total). After applying the feature engineering model, embodiments then factorize each categorical variable. A categorical variable may include, for example, a technical definition of a type of user characteristic. For example, a categorical variable may be defined as a string or character as opposed to a number or decimal.

The resulting dataset is then run through a decision tree model, which splits the characteristics associated with fraud and the characteristics associated with non-fraud. The output of the decision tree model includes one or more nodes with a high class Gini index of 1. In other words, each resulting node is considered highly correlated with fraud (for example, fraudulent e-transfer activity). After the first iteration of the decision tree model, the embodiments may then select nodes having a high Gini index and re-label the datasets associated with the selected nodes with a second binary target.

After determining the second binary target (i.e., a newly labeled dataset), the embodiments then select a subset of all user data that matches the second binary target. As one example, the originally sampled user data may include 50,000 records randomly generated from a full dataset of 18 million records, which was used to determine highly correlated fraud characteristics. Accordingly, as described above, the originally sampled user data was ultimately used to determine and add a new binary target (i.e., the second binary target). Following the example, the selected subset of all user data may include 80,000 records, where these records are already highly associated with fraud (for example, as a result of matching the second binary target). The selected subset of all user data is then run through one or more additional iterations of the decision tree (for example, a second iteration, a third iteration, and the like). For example, after performing a second iteration, the decision tree model outputs one or more nodes with a high class 1 Gini index, where each resulting node is considered extremely correlated with fraud (for example, fraudulent e-transfer activity).

In some embodiments, additional iterations are performed when an accuracy precision threshold (for example, an expected or desired precision level) is not satisfied. For example, the decision tree model may be re-iterated until the accuracy precision threshold is satisfied. Once the accuracy precision threshold is satisfied, embodiments may generate and transmit a report including information associated with a set of user characteristics associated with fraud (for example, a set of user characteristics that pinpoint e-transfer fraud activity at a specified precision level).

One embodiment provides a system for providing rule-based machine learning for precise fraud detection. The system includes an electronic processor configured to receive a first collection of datasets associated with user data, wherein each dataset included in the first collection of datasets is associated with one or more user characteristics. The electronic processor is also configured to receive a second collection of datasets. The electronic processor is also configured to generate, using a rule-based model, an aggregate dataset collection based on the first collection of datasets and the second collection of datasets. The electronic processor is also configured to determine, via a first iteration of a decision tree, a first subset of datasets of the aggregate dataset collection, wherein each dataset included in the first subset of datasets is associated with a first set of user characteristics associated with fraud. The electronic processor is also configured to label, based on the first set of user characteristics, each dataset included in the first subset of datasets with a new binary target variable. The electronic processor is also configured to select a third collection of datasets from the user data based on the new binary target variable, wherein each dataset included in the third collection of datasets is associated with at least one user characteristic associated with fraud. The electronic processor is also configured to determine, via a second iteration of the decision tree, a second subset of datasets of the third collection of datasets, wherein each dataset included in the second subset of datasets is associated with a second set of user characteristics associated with fraud. The electronic processor is also configured to determine whether an accuracy score associated with the second set of user characteristics satisfies an accuracy precision threshold. The electronic processor is also configured to, in response to determining that the accuracy score satisfies the accuracy precision threshold, generate and transmit a report for display to a user, the report including the second set of user characteristics.

Another embodiment provides a method for providing rule-based machine learning for precise fraud detection. The method includes receiving a first collection of datasets associated with user data, wherein each dataset included in the first collection of datasets is associated with one or more user characteristics. The method also includes receiving a second collection of datasets. The method also includes generating, with an electronic processor, using a rule-based model, an aggregate dataset collection based on the first collection of datasets and the second collection of datasets. The method also includes determining, with the electronic processor, via a first iteration of a decision tree, a first subset of datasets of the aggregate dataset collection, wherein each dataset included in the first subset of datasets is associated with a first set of user characteristics associated with fraud. The method also includes labeling, with the electronic processor, based on the first set of user characteristics, each dataset included in the first subset of datasets with a new binary target variable. The method also includes selecting, with the electronic processor, a third collection of datasets from the user data based on the new binary target variable, wherein each dataset included in the third collection of datasets is associated with at least one user characteristic associated with fraud. The method also includes determining, with the electronic processor, via a second iteration of the decision tree, a second subset of datasets of the third collection of datasets, wherein each dataset included in the second subset of datasets is associated with a second set of user characteristics associated with fraud. The method also includes determining, with the electronic processor, whether an accuracy score associated with the second set of user characteristics satisfies an accuracy precision threshold. The method also includes, in response to determining that the accuracy score satisfies the accuracy precision threshold, generating and transmitting, with the electronic processor, a report for display to a user, the report including the second set of user characteristics.

Yet another embodiment provides a non-transitory, computer-readable medium storing instructions that, when executed by an electronic processor, perform a set of functions. The set of functions includes receiving a first collection of datasets associated with user data, wherein each dataset included in the first collection of datasets is associated with one or more user characteristics and receiving a second collection of datasets. The set of functions also includes generating, using a rule-based model, an aggregate dataset collection based on the first collection of datasets and the second collection of datasets. The set of functions also includes determining, via a first iteration of a decision tree, a first subset of datasets of the aggregate dataset collection, wherein each dataset included in the first subset of datasets is associated with a first set of user characteristics associated with fraud. The set of functions also includes labeling, based on the first set of user characteristics, each dataset included in the first subset of datasets with a new binary target variable. The set of functions also includes selecting a third collection of datasets from the user data based on the new binary target variable, wherein each dataset included in the third collection of datasets is associated with at least one user characteristic associated with fraud. The set of functions also includes determining, via a second iteration of the decision tree, a second subset of datasets of the third collection of datasets, wherein each dataset included in the second subset of datasets is associated with a second set of user characteristics associated with fraud. The set of functions also includes determining whether an accuracy score associated with the second set of user characteristics satisfies an accuracy precision threshold. The set of functions also includes, in response to determining that the accuracy score satisfies the accuracy precision threshold, generating and transmitting a report for display to a user, the report including the second set of user characteristics.

Other aspects of the embodiments described herein will become apparent by consideration of the detailed description and accompanying drawings.

Other aspects of the embodiments described herein will become apparent by consideration of the detailed description.

DETAILED DESCRIPTION OF THE EMBODIMENTS

Figure 1:
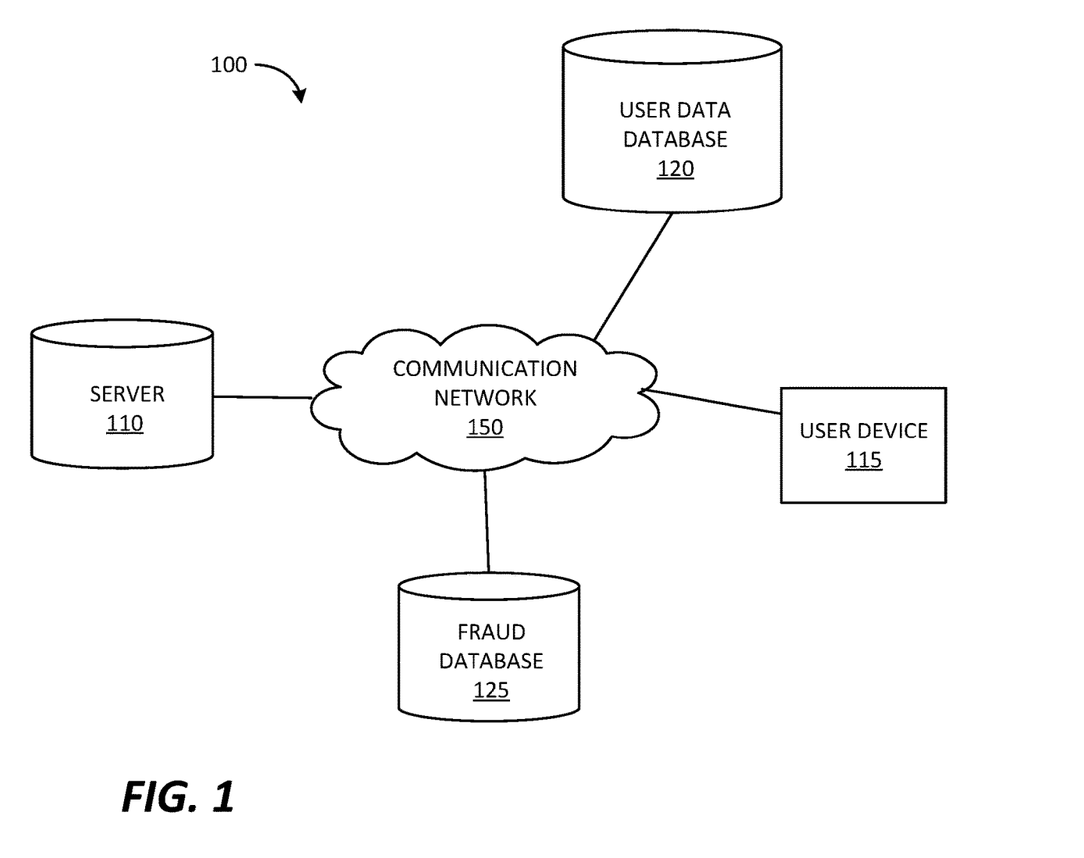
FIG. 1 is a block diagram of a system for providing rule-based machine learning for precise fraud detection according to some embodiments.

FIG. 1 is a block diagram of a system 100 for providing rule-based machine learning for precise fraud detection according to some embodiments. In the example shown, the system 100 includes a server 110, a user device 115, a user data database 120, and a fraud database 125. In some embodiments, the system 100 includes fewer, additional, or different components than illustrated in FIG. 1. For example, the system 100 may include multiple servers 110, user devices 115, user data databases 120, fraud databases 125, or a combination thereof. Also, in some embodiments, one or more of the components of the system 100 may be distributed among multiple servers, databases, or devices, combined within a single server, database, or device, or a combination thereof.

The server 110, the user device 115, the user data database 120, and the fraud database 125 communicate over one or more wired or wireless communication networks 150. Portions of the communication networks 150 may be implemented using a wide area network ("WAN"), such as the Internet, a local area network ("LAN"), such as a Bluetooth™ network or Wi-Fi, and combinations or derivatives thereof. Alternatively or in addition, in some embodiments, the components of the system 100 communicate through one or more intermediary devices not illustrated in FIG. 1. Also, in some embodiments, components of the system 100 (or a portion thereof) communicate directly through the communication network 150.

Figure 2:
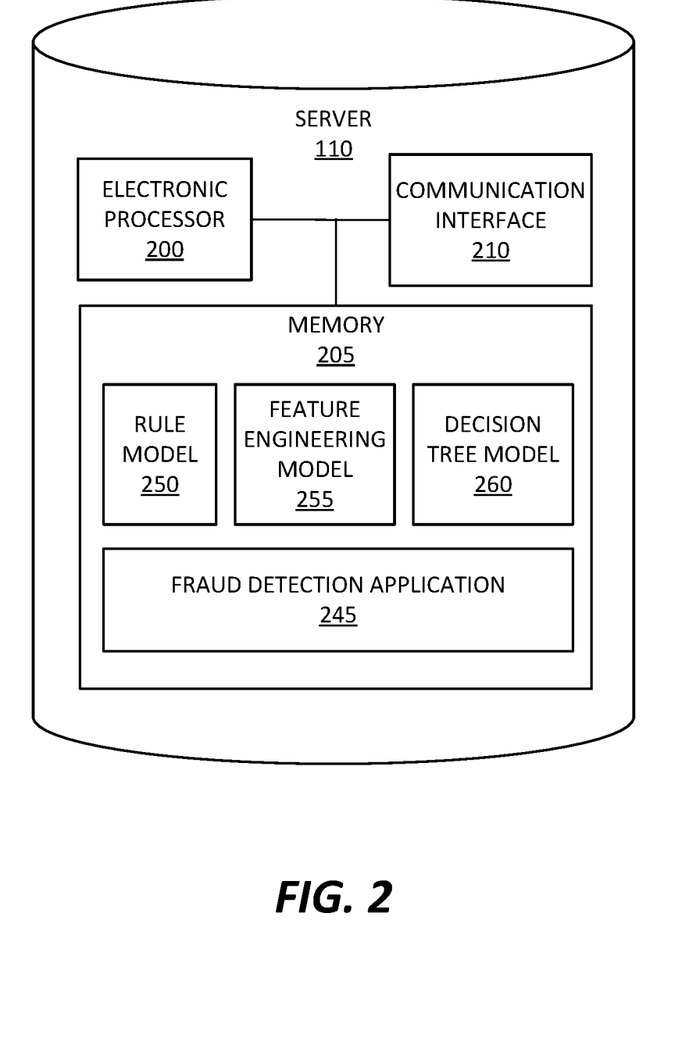
FIG. 2 is a block diagram of a server of the system of FIG. 1 according to some embodiments.

As illustrated in FIG. 2, the server 110 includes an electronic processor 200 (for example, a microprocessor, an application-specific integrated circuit ("ASIC"), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. It should be understood that the server 110 may include additional, different, or fewer components than those illustrated in FIG. 2 in various configurations and may perform additional functionality than the functionality described herein. For example, in some embodiments, the functionality (or a portion thereof) described herein as being performed by the server 110 may be distributed among multiple servers or devices (including as part of a cloud-based service).

The communication interface 210 allows the server 110 to communicate with devices external to the server 110. For example, as illustrated in FIG. 1, the server 110 may communicate with the user device 115, the user data database 120, the fraud database 125, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 150), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 stores a fraud detection application 245 ("the application 245"), a rule model 250, a feature engineering model 255, and a decision tree model 260. The application 245 is a software application executable by the electronic processor 200. As described in more detail below, the application 245, when executed by the electronic processor 200, provides a high-precision fraud detection service that determines user characteristics associated with fraudulent activity. In some embodiments, the application 245 provides the high-precision fraud detection service using the rule model 250, the feature engineering model 255, the decision tree model 260, or a combination thereof, as described in greater detail below.

The fraud database 125 stores fraudulent data. Fraudulent data may include, for example, one or more datasets. In some embodiments, the fraudulent data includes one or more datasets that have been confirmed as fraudulent (for example, includes at least one user characteristic associated with fraud). Each dataset may be associate with a single interaction, such as a single session, a single request, a single electronic transfer (for example, an e-transfer), or the like. A dataset may include one or more data points associated with the dataset. In some embodiments, at least one data point included in a dataset identifies the single interaction. Additionally, the remaining datapoints may be associated with additional information or data associated with the single interaction, such as one or more user characteristics associated with the interaction. As one example, when the fraudulent data includes a dataset associated with an e-transfer, the dataset may include an identification of the e-transfer, an identification of the user device(s) associated with the e-transfer, a timestamp of the e-transfer, geographical information associated with the e-transfer, and the like. Accordingly, in some embodiments, the fraudulent data includes a collection of datasets associated with confirmed fraud.

The user data database 120 stores user data. The user data may include one or more data points or datasets associated with or related to various user characteristics. The data points included in the user data may be associated with, for example, an interaction characteristic, a count (for example, a number of times a first account has interacted with a second account), a speed (for example, a duration of the interaction), a device characteristic, a type of device used for the interaction, a keystroke speed associated with the interaction, a new device type, an account linked to a device associated with the interaction, a cookie type, a interaction attempt count (for example, how many interaction attempts before a successful interaction was performed), a duration on a website or other platform associated with performing the interaction, and the like. Where the interaction is a transfer, the user characteristic(s) may further include, for example, an amount of the transfer, a transfer type a transfer destination (for example, a receiving account or entity of the transfer), a transfer duration (for example, how quickly was the transfer performed), a transfer amount, and the like.

The user device 115 may include one or more desktop computers, laptop computers, tablet computers, terminals, smart telephones, smart televisions, smart wearables, servers, databases, other types of computing devices, or a combination thereof. Although not illustrated in FIG. 1, the user device 115 may include similar components as the server 110, such as an electronic processor, a memory, and a communication interface. The user device 115 may also include one or more input devices (keyboard, keypad, mouse, joystick, touchscreen, and the like) and one or more output devices (display device, touchscreen, printer, speaker, and the like) that receive input from a user and provide output to a user. A user may interact with the user device 115 to access and leverage the high-precision fraud detection service provided by the server 110 (via the application 245). As one example, a user of the user device 115 may interact with (for example, via a display device of the user device 115) one or more user characteristics determined to be associated with fraudulent activity.

Figure 3:
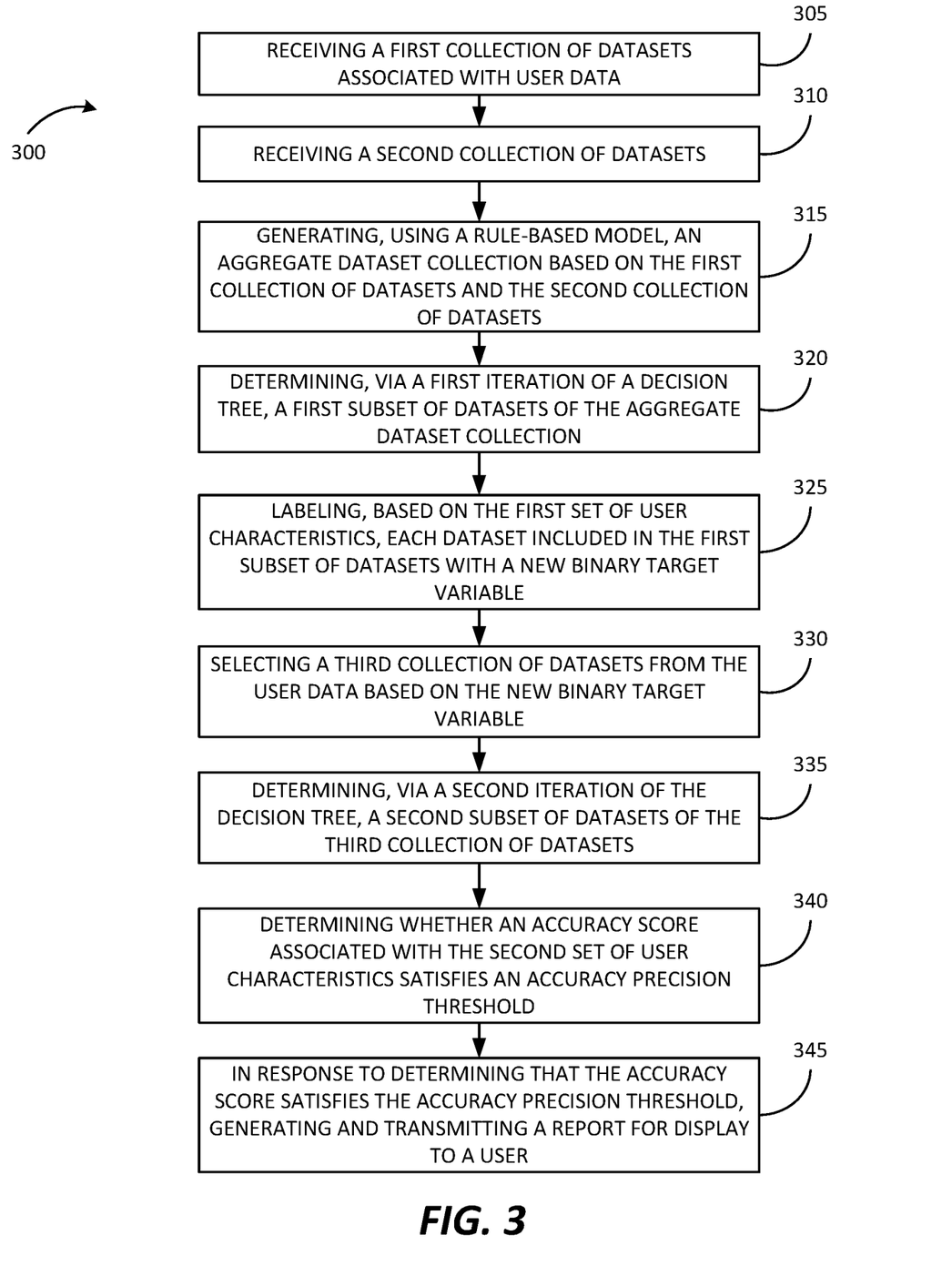
FIG. 3 is a flowchart of a method for providing rule-based machine learning for precise fraud detection using the system of FIG. 1 according to some embodiments.
Figure 4:
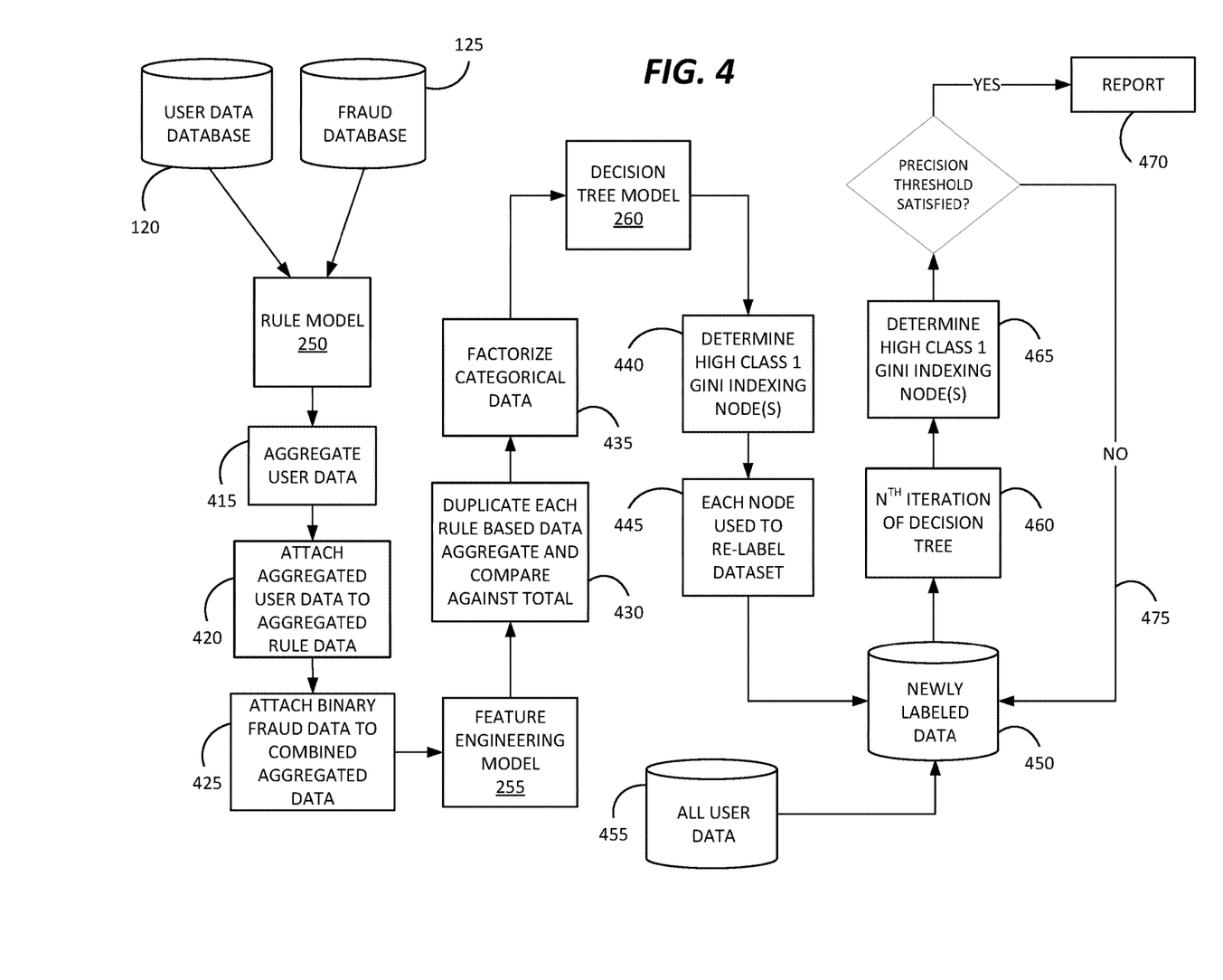
FIG. 4 schematically illustrates an example workflow associated with the method of FIG. 3 according to some embodiments.

FIG. 3 is a flowchart illustrating a method 300 for providing rule-based machine learning for precise fraud detection according to some embodiments. The method 300 is described as being performed by the server 110 and, in some embodiments, the electronic processor 200 executing the application 245. However, as noted above, the functionality performed by the server 110 (or a portion thereof) may be performed by other devices (via an electronic processor executing instructions), including, for example, the user device 115. The method 300 is described with reference to FIG. 4. FIG. 4 illustrates an example workflow according to some embodiments.

As seen in FIG. 3, the method 300 includes receiving (or accessing) a first collection of datasets associated with user data (at block 305). Each dataset included in the first collection of datasets is associated with one or more user characteristics, such as transfer characteristics, device characteristics, input characteristics, geo-location characteristics, and the like (as described above with respect to the user data database 120). In some embodiments, the first collection of datasets is a random sampling of datasets or data points from user data, such as the user data stored in the user data database 120. Accordingly, in some embodiments, the first collection of datasets includes one or more datasets or data points of the user data stored in the user data database 120. In some embodiments, the electronic processor 200 receives (or accesses) the first collection of datasets from the user data database 120 through the communication network 150 via the communication interface 210.

The electronic processor 200 also receives (or accesses) a second collection of datasets (at block 310). In some embodiments, the second collection of datasets includes data associated with confirmed fraud, such as the fraudulent data stored in the fraud database 125. As one example, the second collection of datasets may be a spreadsheet outlining a plurality of transfers (including associated data, such as one or more user characteristics associated with each transfer), where each transfer included in the spreadsheet has been confirmed as being fraudulent transfers. In some embodiments, the electronic processor 200 receives (or accesses) the second collection of datasets from the fraud database 125 through the communication network 150 via the communication interface 210.

After receiving the first collection of datasets and the second collection of datasets (at blocks 305 and 310), the electronic processor 200 generates an aggregate dataset collection based on the first collection of datasets and the second collection of datasets (at block 315). In some embodiments, the electronic processor 200 generates the aggregate dataset collection using a rule-based model (for example, the rule model 250 stored in the memory 205 of the server 110). Each aggregate dataset included in the aggregate dataset collection may be labeled with a binary target variable. In some embodiments, the rule-based model creates the aggregate dataset by layering one or more rules over the dataset and then selecting data that matches a desired precision threshold. In such embodiments, the rules may be a Markov chain (for example, multiple rules chained together to form a semblance of intelligence). One example of a rule may include, at Node 1, if A is greater than B then move on to Node 2, otherwise, if B is less than C move on to Node 3. The binary target variable indicates whether at least one user characteristic associated with a corresponding aggregate dataset is associated with fraud. Alternatively or in addition, in some embodiments, the binary target variable in the aggregated dataset may be synthetic (for example, added to improve future modeling activities). As one example, the binary target variable may be a "0" when the dataset is not associated with fraud and may be a "1" when the dataset is associated with fraud. For example, as seen in FIG. 4, the first collection of datasets and the second collection of datasets is provided to the rule model 250. In response to receiving the first collection of datasets and the second collection of datasets, the user data (i.e., the first collection of datasets) is aggregated across an individual session (at block 415), where session generally refers to a length of time and a grouping of interactions associated with a specific website, online tool, or the like. The aggregated user data is then attached to aggregated rule data (at block 420). Binary fraudulent data is attached to the combined aggregated data (at block 425) (for example, as the aggregate dataset collection generated at block 315 of FIG. 3). Accordingly, the process of blocks 415-425 includes joining multiple datasets from across multiple sources to create a "master" dataset.

Although not illustrated in FIG. 3, in some embodiments, the electronic processor 200 may supplement the aggregate dataset collection using a feature engineering model (for example, the feature engineering model 255 stored in the memory 205 of the server 110), as seen in FIG. 4. In some embodiments, the electronic processor 200 supplements the aggregate dataset collection (using the feature engineering model 255) by converting at least one datapoint included in the aggregate dataset collection from a count value to a percentage value, where the percentage value is added as a new datapoint (or feature) for each dataset included in the aggregate dataset collection (at block 430 in FIG. 4). For example, the electronic processor 200 (via the feature engineering model 255) duplicates each rule-based data aggregate and compares each duplicated rule-based data aggregate against a total. As one example, when a user attempted to log on to the website 10 times with 5 different IP addresses, the feature engineering model 255 may create an additional feature and attach the additional to the dataset of 50% (5/10). This is important when looking at the scale of traffic on the website and how the machine learning model interprets the dataset. Attempting to log on to the website 100 times with 5 different IP addresses (5%) may be a normal (non-fraudulent) user activity. The model does not understand the difference between those two values though unless they are normalized or factorized against one another. The model now has the opportunity to be more precise as the model looks at not only single entity variables, but also dataset normalized variables. Accordingly, in some embodiments, after supplementing the aggregated dataset collection using the feature engineering model, the electronic processor 200 factorizes each dataset included in the aggregate dataset collection based on user characteristics (at block 435 of FIG. 4).

As seen in FIG. 3, the electronic processor 200 then determines a first subset of datasets of the aggregate dataset collection (at block 320). Each dataset included in the first subset of datasets may be associated with a first set of user characteristics associated with fraud. In some embodiments, the electronic processor 200 determines the first subset of datasets using a decision tree (for example, the decision tree model 260 stored in the memory 205 of the server 110). For example, as illustrated in the example of FIG. 4, the output of the decision tree model 260 includes a set of nodes, where each node represents one or more user characteristics associated with fraud (for example, highly associated with fraud). In some embodiments, the set of nodes is determined based on Gini indexing. In particular, the nodes included in the set of nodes may be nodes associated with a Gini index or coefficient of one (or 100%), as seen at block 440 of FIG. 4.

After determining the first subset of datasets using the decision tree model 260, the electronic processor 200 labels (or re-labels) each dataset included in the first subset of datasets with a new binary target variable (at block 325). As noted above, a binary target variable indicates whether the dataset is associated with fraud. As one example, the binary target variable may be a "0" when the dataset is not associated with fraud and may be a "1" when the dataset is associated with fraud. In some embodiments, the electronic processor 200 labels (or re-labels) each dataset based on the first set of user characteristics. In other words, with reference to FIG. 4, each node may be used to re-label the dataset, which segments different populations (or datasets or points) to reduce cross sections (at block 445). Segmenting the different populations is useful to either focus or exclude different populations based on their characteristics (also known as classifying). For example, when the model determines a certain population (all with similar user characteristics) has a 0% fraud rate then it may be necessary to exclude that population from future iterations. Reducing the cross section of data in this way improves the accuracy of the model, which may begin to understand more minute differences between population cross sections. In some embodiments, the re-labeled dataset may be stored. For example, as illustrated in FIG. 4, the re-labeled dataset may be stored as "a newly labeled dataset" in a database or other storage location/device (represented by reference numeral 450), such as the memory 205 of the server 110.

The electronic processor 200 may then select a third collection of datasets from the user data based on the new binary target variable (at block 330). For example, as seen in FIG. 4, the electronic processor 200 accesses the user data (represented by reference numeral 455). Each dataset included in the third collection of datasets may be associated with at least one user characteristic associated with fraud. Accordingly, in some embodiments, the electronic processor 200 selects a subpopulation of the user data, where that subpopulation matches the new binary target variable (for example, the one or more user characteristics of the subpopulation matches the one or more user characteristics of the newly label dataset).

In some embodiments, the electronic processor 200 then determines, via a second iteration of the decision tree model 260 (represented in FIG. 4 by reference numeral 460), a second subset of datasets of the third collection of datasets (at block 335). Each dataset included in the second subset of datasets is associated with a second set of user characteristics associated with fraud. The output of the second iteration of the decision tree model 260 includes one or more nodes that are considered highly correlated with fraud (for example, node(s) having a high class Gini index or coefficient of one or 100%).

After the second iteration of the decision tree model 260 (at block 335), the electronic processor 200 determines whether an accuracy score associated with the second set of user characteristics satisfies an accuracy precision threshold (at block 340). The accuracy score indicates how accurately fraud is detected. In some embodiments, the electronic processor 200 determines the accuracy score the amount of fraudulent sessions (or users) in a model's node (for example, through a Gini index). As one example, if a set of characteristics has 10 fraudulent sessions out of a total of 20 sessions, then the accuracy of that node would be 50%. The accuracy precision threshold represents an acceptable or expected accuracy associated with detecting a dataset as fraud (for example, based on one or more user characteristics associated with the dataset). In some embodiments, the accuracy precision threshold may be predetermined or preset. For example, the accuracy precision threshold may be set (via the user device 115) based on a user or entity preference. However, in other embodiments, the accuracy precision threshold may be dynamic or varying (for example, based on a client's need or expectation). For example, when a client desires an accuracy score of 50%, then the model may select any node matching that threshold. With reference to FIG. 4, in some embodiments, the electronic processor 200 determines the Gini index or coefficient associated with the second set of user characteristics (at block 465). In some embodiments, the Gini index is used to determine accuracy. An example Gini index may be 0.90.

In response to determining that the accuracy score satisfies the accuracy precision threshold, the electronic processor 200 generates and transmits a report for display to a user (at block 345). The report may include information associated with the second set of user characteristics. For example, the report may include a listing of the second set of user characteristics, performance metrics associated with the second set of user characteristics (for example, an accuracy score), or the like. For example, as illustrated in FIG. 4, the electronic processor 200 may provide a listing of highly precise user characteristics associated with fraud (at block 470). In some embodiments, the electronic processor 200 generates the report and transmits the report to the user device 115 for display on a display device of the user device 115. In response to receiving the report, the user device 115 may display the report to a user of the user device 115. Alternatively or in addition, the user device 115 (via an electronic processor of the user device 115) may perform additional processing or analysis of the information included in the report. Accordingly, the electronic processor 200 transmits the report to the user device 115 such that a user of the user device 115 may interact with the report. Accordingly, in some embodiments, the model returns a binary result based on data gathered in real time during the user session. When the model states a specific session is fraudulent, the user may respond by blocking their action (for example, not allow an e-transfer), requesting them to respond to an MFA request (for example, what was the name of your high school), or the like.

In response to determining that the accuracy score does not satisfy the accuracy precision threshold, the electronic processor 200 performs an additional iteration of the decision tree model 260 (represented in FIG. 4 by the arrow labeled with reference numeral 475). For example, in some embodiments, the electronic processor 200 determines, via a third iteration of the decision tree model 260, a third subset of datasets of the second subset of datasets, where each dataset included in the third subset of datasets is associated with a third set of user characteristics associated with fraud. The electronic processor 200 then determines whether a second accuracy score associated with the third set of user characteristics satisfies an accuracy precision threshold. In response to determining that the second accuracy score satisfies the accuracy precision threshold, the electronic processor 200 generates and transmits the report for display to the user, the report including information associated with the third set of user characteristics. However, in response to determining that the second accuracy score does not satisfy the accuracy precision threshold, the electronic processor 200 may perform yet another iteration of the decision tree model 260. Accordingly, in some embodiments, the electronic processor 200 continues to perform iterations of the decision tree model 260 until the accuracy score satisfies the accuracy precision threshold.

As a result of each additional iteration of the decision tree model 260 the accuracy score increases. As one example, with respect to the second iteration of the decision tree model 260, the first set of user characteristics may be associated with a first fraud association level and the second set of user characteristics may be associated with a second fraud association level, where the second fraud association level is more associated with fraud than the first fraud association level. In other words, the second set of user characteristics is more associated with fraud than the first set of user characteristics. Similarly, as another example, the second set of user characteristics may be associated with the second fraud association level and the third set of user characteristics may be associated with a third fraud association level, where the third fraud association level is more associated with fraud than the second fraud association level. In other words, the third set of user characteristics is more associated with fraud than the second set of user characteristics. Accordingly, each iteration of the decision tree model 260 outputs a new set of user characteristics, where each new set of user characteristics are more associated with fraud (for example, more accurately detects fraudulent activity) than the previous set of user characteristics.

Thus, the embodiments described herein provide, among other things, methods and systems for providing rule-based machine learning for precise fraud detection. Various features and advantages of the embodiments are set forth in the following claims.

It is to be understood that the embodiments are not limited in its application to the details of construction and the arrangement of components set forth in the following description or illustrated in the accompanying drawings. The embodiments are capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

What is claimed is:

1. A system for providing rule-based machine learning for precise fraud detection in heavily imbalanced datasets, the system comprising:
    a server including an electronic processor, a memory, and an electronic communication interface, wherein the memory stores software modules including a rule-based model, a feature engineering model, and a decision tree model, wherein the electronic communication interface is configured to be in electronic communication with a plurality of user computing devices conducting transaction interactions with the server;
    the electronic processor configured to
        receive, from a user data database via the electronic communication interface, a first collection of datasets associated with user interaction data, wherein each dataset included in the first collection of datasets is associated with one or more user characteristics,
        receive, from a fraud database via the electronic communication interface, a second collection of datasets associated with user interaction data,
        generate, using the rule-based model, an aggregate dataset collection based on the first collection of datasets and the second collection of datasets, wherein each dataset in the aggregate dataset collection is labeled with a binary target variable indicating whether a user characteristic of each dataset is associated with fraud, wherein the user characteristic comprises at least one datapoint in each dataset which represents a count of the number of times the user has interacted with the server in a single electronic transaction interaction or session,
        supplement, using the feature engineering model, the aggregate dataset collection by converting the at least one datapoint included in each dataset of the aggregate dataset collection from a count value to a percentage value, wherein the percentage value is added as a new datapoint for each dataset included in the aggregate dataset collection,
        determine, via a first iteration of the decision tree model, a first subset of datasets of the aggregate dataset collection, wherein each dataset included in the first subset of datasets is associated with a first set of user characteristics associated with fraud, wherein the determining is based on an accuracy score generated by a precision metric,
        relabel, based on the first set of user characteristics, each dataset included in the first subset of datasets with a new binary target variable indicating whether each dataset included in the first subset of datasets is associated with fraud,
        generate, by excluding the datasets not associated with fraud from the first subset of datasets, a segmented first subset of data, wherein each dataset of the segmented first subset of datasets includes the first set of user characteristics associated with fraud,
        select a third collection of datasets from the user data based on the new binary target variable, wherein each dataset included in the third collection of datasets is associated with at least one user characteristic associated with fraud,
        determine, via a second iteration of the decision tree model, a second subset of datasets of the third collection of datasets, wherein each dataset included in the second subset of datasets is associated with a second set of user characteristics associated with fraud,
        determine whether an accuracy score associated with the second set of user characteristics satisfies an accuracy precision threshold,
        in response to determining that the accuracy score satisfies the accuracy precision threshold, generate and transmit a report for display to a user, the report including the second set of user characteristics,
        receive, from a user computing device, user interaction data gathered during a user session, and
        output, using the decision tree model and based on the second set of user characteristics and the user interaction data gathered during the user session, an indication that the user session is associated with fraudulent activity.

2. The system of claim 1, wherein the second collection of datasets includes data associated with confirmed fraud.

3. The system of claim 1, wherein each aggregate dataset included in the aggregate dataset collection is labeled with the binary target variable that indicates whether at least one user characteristic associated with a corresponding aggregate dataset is associated with fraud.

4. The system of claim 1, wherein the electronic processor is further configured to, prior to the first iteration of the decision tree model, supplement the aggregate dataset collection using the feature engineering model.

5. The system of claim 1, wherein the electronic processor is further configured to, prior to the first iteration of the decision tree model, factorize each dataset included in the aggregate dataset collection based on user characteristics.

6. The system of claim 1, wherein the first collection of datasets is a random sampling of datasets from the user data.

7. The system of claim 1, wherein the first set of user characteristics is associated with a first fraud association level and the second set of user characteristics is associated with a second fraud association level, wherein the second fraud association level is more associated with fraud than the first fraud association level.

8. The system of claim 1, wherein the electronic processor is configured to
    in response to determining that the accuracy score does not satisfy the accuracy precision threshold,
        determine, via a third iteration of the decision tree model, a third subset of datasets of the second subset of datasets, wherein each dataset included in the third subset of datasets is associated with a third set of user characteristics associated with fraud,
        determine whether a second accuracy score associated with the third set of user characteristics satisfies the accuracy precision threshold, and
        in response to determining that the second accuracy score satisfies the accuracy precision threshold, generate and transmit the report for display to the user, the report including the third set of user characteristics.

9. The system of claim 8, wherein the second set of user characteristics is associated with a second fraud association level and the third set of user characteristics is associated with a third fraud association level, wherein the third fraud association level is more associated with fraud than the second fraud association level.

10. A method for providing rule-based machine learning for precise fraud detection in heavily imbalanced datasets, the method comprising:
    receiving, from a user data database via an electronic communication interface of a server, a first collection of datasets associated with user interaction data, wherein each dataset included in the first collection of datasets is associated with one or more user characteristics, wherein the server includes an electronic processor, a memory, and the electronic communication interface, wherein the memory stores software modules including a rule-based model, a feature engineering model, and a decision tree model, wherein the electronic communication interface is in electronic communication with a plurality of user computing devices conducting transaction interactions with the server;
    receiving, from a fraud database via the electronic communication interface, a second collection of datasets associated with user interaction data, wherein the second collection of datasets includes data associated with confirmed fraud;
    generating, with the electronic processor, using the rule-based model, an aggregate dataset collection based on the first collection of datasets and the second collection of datasets, wherein each dataset in the aggregate dataset collection is labeled with a binary target variable indicating whether a user characteristic of each dataset is associated with fraud, wherein the user characteristic comprises at least one datapoint in each dataset which represents a count of the number of times a user has interacted with the server in a single electronic transaction interaction or session;
    supplementing, with the electronic processor, the aggregate dataset collection using the feature engineering model includes converting the at least one datapoint included in each dataset of the aggregate dataset collection from a count value to a percentage value, wherein the percentage value is added as a new datapoint for each dataset included in the aggregate dataset collection;
    determining, with the electronic processor, via a first iteration of the decision tree model, a first subset of datasets of the aggregate dataset collection, wherein each dataset included in the first subset of datasets is associated with a first set of user characteristics associated with fraud, wherein the determining is based on an accuracy score generated by a precision metric;
    relabeling, with the electronic processor, based on the first set of user characteristics, each dataset included in the first subset of datasets with a new binary target variable indicating whether each dataset included in the first subset of datasets is associated with fraud;
    generating, with the electronic processor, by excluding the datasets not associated with fraud from the first subset of datasets, a segmented first subset of data, wherein each dataset of the segmented first subset of datasets includes the first set of user characteristics associated with fraud;
    selecting, with the electronic processor, a third collection of datasets from the user data based on the new binary target variable, wherein each dataset included in the third collection of datasets is associated with at least one user characteristic associated with fraud;
    determining, with the electronic processor, via a second iteration of the decision tree model, a second subset of datasets of the third collection of datasets, wherein each dataset included in the second subset of datasets is associated with a second set of user characteristics associated with fraud;
    determining, with the electronic processor, whether an accuracy score associated with the second set of user characteristics satisfies an accuracy precision threshold;
    in response to determining that the accuracy score satisfies the accuracy precision threshold, generating and transmitting, with the electronic processor, a report for display to a user, the report including the second set of user characteristics;
    receiving, from a user computing device with the electronic processor, user interaction data gathered during a user session; and
    outputting, with the electronic processor using the decision tree model, an indication that the user session is associated with fraudulent activity based on the second set of user characteristics and the user interaction data gathered during the user session.

11. The method of claim 10, further comprising:
prior to the first iteration of the decision tree model, supplementing the aggregate dataset collection using the feature engineering model.

12. The method of claim 10, further comprising:
prior to the first iteration of the decision tree model, factorizing the aggregate dataset collection based on user characteristics.

13. The method of claim 10, further comprising:
in response to determining that the accuracy score does not satisfy the accuracy precision threshold,
determining, via a third iteration of the decision tree model, a third subset of datasets of the second subset of datasets, wherein each dataset included in the third subset of datasets is associated with a third set of user characteristics associated with fraud,
determining whether a second accuracy score associated with the third set of user characteristics satisfies the accuracy precision threshold, and
in response to determining that the second accuracy score satisfies the accuracy precision threshold, generate and transmit the report for display to the user, the report including the third set of user characteristics.

14. A non-transitory, computer-readable medium storing instructions that, when executed by an electronic processor, perform a set of functions for providing rule-based machine learning for precise fraud detection in heavily imbalanced datasets, the set of functions comprising:
receiving, from a user data database via an electronic communication interface of a server, a first collection of datasets associated with user interaction data, wherein each dataset included in the first collection of datasets is associated with one or more user characteristics, wherein the server includes the electronic processor, a memory, and the electronic communication interface, wherein the memory stores software modules including a rule-based model, a feature engineering model, and a decision tree model, wherein the electronic communication interface is in electronic communication with a plurality of user computing devices conducting transaction interactions with the server;
receiving, from a fraud database via the electronic communication interface, a second collection of datasets associated with user interaction data;
generating, using the rule-based model, an aggregate dataset collection based on the first collection of datasets and the second collection of datasets, wherein each dataset in the aggregate dataset collection is labeled with a binary target variable indicating whether a user characteristic of each dataset is associated with fraud, wherein the user characteristic comprises at least one datapoint in each dataset which represents a count of the number of times a user has interacted with the server in a single electronic transaction interaction or session;
supplementing the aggregate dataset collection using the feature engineering model by converting at least one datapoint included in each dataset of the aggregate dataset collection from a count value to a percentage value, wherein the percentage value is added as a new datapoint for each dataset included in the aggregate dataset collection;
determining, via a first iteration of the decision tree model, a first subset of datasets of the aggregate dataset collection, wherein each dataset included in the first subset of datasets is associated with a first set of user characteristics associated with fraud, wherein the determining is based on an accuracy score generated by a precision metric;
relabeling, based on the first set of user characteristics, each dataset included in the first subset of datasets with a new binary target variable indicating whether each dataset included in the first subset of datasets is associated with fraud;
generating, with the electronic processor, by excluding the datasets not associated with fraud from the first subset of datasets, a segmented first subset of data, wherein each dataset of the segmented first subset of datasets includes a first set of user characteristics associated with fraud;
selecting a third collection of datasets from the user data based on the new binary target variable, wherein each dataset included in the third collection of datasets is associated with at least one user characteristic associated with fraud;
determining, via a second iteration of the decision tree model, a second subset of datasets of the third collection of datasets, wherein each dataset included in the second subset of datasets is associated with a second set of user characteristics associated with fraud;
determining whether an accuracy score associated with the second set of user characteristics satisfies an accuracy precision threshold;
in response to determining that the accuracy score satisfies the accuracy precision threshold, generating and transmitting a report for display to a user, the report including the second set of user characteristics;
receiving, from a user computing device, user interaction data gathered during a user session, and
outputting, using the decision tree model and based on the second set of user characteristics and the user interaction data gathered during the user session, an indication that the user session is associated with fraudulent activity.

15. The non-transitory, computer-readable medium of claim 14, wherein the set of functions further comprises:
prior to the first iteration of the decision tree model, supplementing the aggregate dataset collection using the feature engineering model.

16. The non-transitory, computer-readable medium of claim 14, further comprising:
prior to the first iteration of the decision tree model, factorizing the aggregate dataset collection based on user characteristics.

17. The non-transitory, computer-readable medium of claim 14, further comprising:
in response to determining that the accuracy score does not satisfy the accuracy precision threshold,
determining, via a third iteration of the decision tree model, a third subset of datasets of the second subset of datasets, wherein each dataset included in the third subset of datasets is associated with a third set of user characteristics associated with fraud,
determining whether a second accuracy score associated with the third set of user characteristics satisfies the accuracy precision threshold, and
in response to determining that the second accuracy score satisfies the accuracy precision threshold, generate and transmit the report for display to the user, the report including the third set of user characteristics.

* * * * *